United States Patent
Ho et al.

(10) Patent No.: US 7,663,547 B2
(45) Date of Patent: Feb. 16, 2010

(54) DETERMINING A GEOLOCATION SOLUTION OF AN EMITTER ON EARTH BASED ON WEIGHTED LEAST-SQUARES ESTIMATION

(75) Inventors: Dominic K. C. Ho, Columbia, MO (US); Jeffrey C. Chu, Los Altos, CA (US); Michael L. Downey, Livermore, CA (US)

(73) Assignee: Glowlink Communications Technology, Inc., Los Altos, CA (US)

( * ) Notice: Subject to any disclaimer, the term of this patent is extended or adjusted under 35 U.S.C. 154(b) by 318 days.

(21) Appl. No.: 11/735,158

(22) Filed: Apr. 13, 2007

(65) Prior Publication Data
US 2008/0252525 A1 Oct. 16, 2008

(51) Int. Cl.
  *G01S 1/24* (2006.01)
  *G01S 3/02* (2006.01)
(52) U.S. Cl. .................. 342/387; 342/442; 342/453
(58) Field of Classification Search ............... 342/387, 342/442, 450, 453, 457, 463–465; 455/456.2, 455/457
See application file for complete search history.

(56) References Cited

U.S. PATENT DOCUMENTS

| | | | |
|---|---|---|---|
| 3,747,095 A | 7/1973 | Wilson | |
| 5,008,679 A | 4/1991 | Effland et al. | |
| 5,594,452 A | 1/1997 | Webber et al. | |
| 5,973,643 A * | 10/1999 | Hawkes et al. | 342/457 |
| 6,018,312 A | 1/2000 | Haworth | |
| 6,618,009 B2 | 9/2003 | Griffin et al. | |
| 6,677,893 B2 | 1/2004 | Rideout et al. | |
| 6,876,859 B2 * | 4/2005 | Anderson et al. | 455/456.1 |
| 7,436,359 B1 * | 10/2008 | Rose | 342/424 |
| 7,453,400 B2 * | 11/2008 | Struckman et al. | 342/465 |
| 2002/0070889 A1 | 6/2002 | Griffin et al. | |
| 2003/0117319 A1 | 6/2003 | Rideout et al. | |
| 2004/0027276 A1 | 2/2004 | Herman | |
| 2004/0233100 A1 | 11/2004 | Dibble et al. | |
| 2008/0158059 A1 * | 7/2008 | Bull et al. | 342/387 |

OTHER PUBLICATIONS

PCT International Search Report and Written Opinion, PCT/US2008/060077, Dec. 9, 2008.
K. C. Ho et al, *Solution and Performance Analysis of Geolocation by TDOA*, IEEE Transactions on Aerospace and Electronic Systems, Oct. 1993, pp. 1311-1322, vol. 29, No. 4.
K. C. Ho et al, *Geolocation of a Known Altitude Object From TDOA and FDOA Measurements*, IEEE Transactions on Aerospace and Electronic Systems, Jul. 1997, pp. 770-783, vol. 33, No. 3.
Wade H. Foy, *Position-Location Solutions by Taylor-Series Estimation*, IEEE Transactions on Aerospace and Electronic Systems, Mar. 1976, pp. 187-193, vol. AES-12, No. 2.

(Continued)

*Primary Examiner*—Dao L Phan
(74) *Attorney, Agent, or Firm*—Westberg Law Offices

(57) ABSTRACT

Embodiments provide systems and methods for determining the geolocation of an emitter on earth based on weighted least-squares estimation based on two TDOA and two FDOA measurements, none of which need to be acquired at the same time. The four TDOA and FDOA measurements and the errors in each of the measurements are determined. Weights for the errors in the TDOA and FDOA measurements are determined, and the weights are applied in a weighted errors function. The weights account for the errors in the measurements and the errors in the satellite positions and velocities, and are dependent on the localization geometry. The weighted errors function is minimized to determine the location estimate of the unknown emitter.

24 Claims, 4 Drawing Sheets

OTHER PUBLICATIONS

Tim Pattison et al, *Sensitivity Analysis of Dual-Satellite Geolocation*, IEEE Transactions on Aerospace and Electronic Systems, Jan. 2000, pp. 56-71, vol. 36, No. 1.

PCT International Search Report and Written Opinion, PCT/US2008/060084, Jul. 7, 2008.

* cited by examiner

DETERMINING A GEOLOCATION SOLUTION OF AN EMITTER ON EARTH BASED ON WEIGHTED LEAST-SQUARES ESTIMATION

CROSS-REFERENCE TO RELATED APPLICATION(S)

This application is related to U.S. patent application Ser. No. 11/735,146, titled "Determining A Geolocation Solution Of An Emitter On Earth Based On Weighted Leasted-Squares Approximation", filed Apr. 13, 2007, which is hereby incorporated by reference in its entirety.

BACKGROUND OF THE INVENTION

1. Field of the Invention

This invention pertains to determining a geolocation for unknown emitters based on measurements of satellite signals.

2. Description of the Related Art

FIG. 1 shows a geolocation scenario 100 where an emitter 110 on the earth's surface 101 can be located using three satellites $s_1$, $s_2$, and $s_3$. The satellites $s_1$, $s_2$, and $s_3$ have non-zero velocities with respect to the earth. The unknown emitter 110 sends out signal 112 and it is received by the satellites $s_1$, $s_2$, and $s_3$. The satellites $s_1$, $s_2$, and $s_3$ relay the signal 114 to a ground station 120 or other observation point.

The ground station 120 computes the time-difference of arrival (TDOA), denoted as $d_{21}$, between the signal 112 from the emitter 110 through the primary satellite $s_1$ to the ground station 120 and the signal 112 from the emitter 110 through another satellite $s_2$ to the ground station 120. Similarly, the TDOA of the signal 112 from the emitter 110 through the first satellite $s_1$ to the ground station 120 and the signal 112 from the emitter 110 through a third satellite $s_3$ to the ground station 120 is also measured, which is denoted as $d_{31}$.

From a TDOA measurement and the locations of the two satellites used in the TDOA measurement, a three-dimensional curved surface can be derived that defines the possible locations of the emitter 110. The ground station 120 does not know precisely the positions and velocities of the satellites. A stationary reference emitter 130, whose position is known exactly, is used to reduce the effect of the position and velocity errors of the satellites on the part of the ground station 120 in the estimation of the emitter 110 location.

Previous theoretical work in this field, such as K. C. Ho and Y. T. Chan, "Geolocation of a known altitude object from TDOA and FDOA measurements," *IEEE Trans. Aerosp. Electron. Syst.*, vol. 33, pp. 770-783, July 1997 ("Ho and Chan"), which is incorporated herein by reference in its entirety, shows how to estimate the location of the emitter 110 by finding the intersection of two TDOA curves on the earth's surface. However, current techniques to find the location of the emitter 110 from two TDOA measurements assume that the two TDOA signals are acquired simultaneously. In practice, this is often not the case or not even possible. For example, the technical limitations of the equipment, including the limitations in the aperture of the receiving antennas of the ground station 120, may prevent two measurements from being acquired simultaneously. Also, in some situations, not all three of the satellites $s_1$, $s_2$, and $s_3$ are able to observe the same signal from the emitter 110 at the same time.

Alternatively, the location of an unknown emitter 110 can be found through measurements of the Doppler frequency shift in the received signals 114 at the ground station 120. Because the satellites $s_1$, $s_2$, and $s_3$ have non-zero velocities with respect to the earth, the received signals 114 at the ground station 120 relayed through the satellites $s_1$, $s_2$, and $s_3$ will be subject to Doppler frequency shift. This causes a frequency difference of arrival (FDOA) of the signals 112 relayed through satellite pair $s_1$ and $s_2$, denoted as $f_{21}$, and an FDOA of the signals 112 relayed through satellite pair $s_1$ and $s_3$, denoted as $f_{31}$. From an FDOA measurement and the locations of the two satellites used in the FDOA measurement, a three-dimensional curved surface can be derived that defines the possible locations of the emitter 110. Again, the ground station 120 does not know precisely the positions and velocities of the satellites. A stationary reference emitter 130, whose position is known exactly, is used to reduce the effect of the position and velocity errors of the satellites on the part of the ground station 120 in the estimation of the emitter 110 location. The location of an emitter 110 can be estimated by finding the intersection of the two FDOA curves on the earth's surface.

Further alternatively, some have suggested that the location of an unknown emitter 110 can be found using one TDOA measurement and one FDOA measurement. However, these solutions require that the signals to generate the TDOA and FDOA measurements be acquired at the same time and that they come from the same satellite pair. These conditions are often not fulfilled in practice.

Thus, there is a need for systems and methods of more accurately determining the location of an emitter. There is also a need to accurately determine the location of an emitter where the signals from different satellites are acquired at different times.

SUMMARY

Embodiments of the invention provide systems and methods for determining the geolocation of an emitter on earth using the four TDOA and FDOA measurements based on weighted least-squares estimation, regardless of whether the signals from different satellites are acquired at different times. The four TDOA and FDOA measurements and the errors in each of the measurements are determined. Weights for the errors in the TDOA and FDOA measurements are determined, and the weights are applied in a weighted errors function. The weighted errors function is minimized to determine the location estimate of the unknown emitter.

In one embodiment, the weights for the errors in the TDOA and FDOA measurements depend on the emitter position. An estimate of the emitter position is made, for example, by using a TDOA-FDOA solution. A more accurate estimate of the emitter location is found by minimizing the weighted errors function. This process can be iterated until the estimate of the emitter location does not change.

The present invention has various embodiments, including as a computer implemented process, as computer apparatuses, and as computer program products that execute on general or special purpose processors. The features and advantages described in this summary and the following detailed description are not all-inclusive. Many additional features and advantages will be apparent to one of ordinary skill in the art in view of the drawings, detailed description, and claims.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
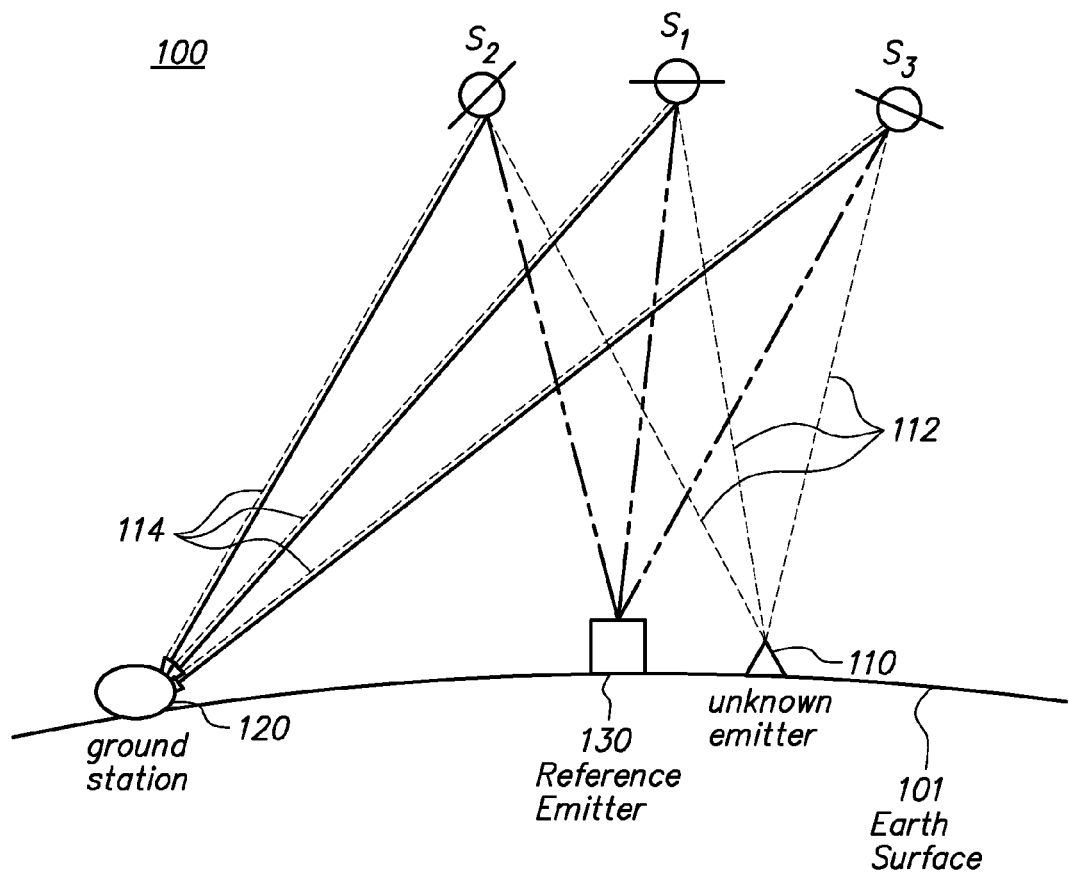
FIG. 1 illustrates the geolocation scenario where an emitter with an unknown location emits signals that are received at a ground station through three different satellites.

FIG. 1 illustrates the geolocation scenario 100 where an emitter 110 with an unknown location emits signals 112 that are received at an observer, referred to herein as a ground station 120, through three different satellites. As described above, the satellites $s_1$, $s_2$, and $s_3$ have non-zero velocities with respect to the earth. The unknown emitter 110 sends out signal 112 and it is received by the satellites $s_1$, $s_2$, and $s_3$. The satellites $s_1$, $s_2$, and $s_3$ relay the signal 114 to a ground station 120.

The ground station 120 determines the time-difference of arrival (TDOA), denoted as $d_{21}$, between the signal 112 from the emitter 110 through the primary satellite $s_1$ to the ground station 120 and the signal 112 from the emitter 110 through another satellite $s_2$ to the ground station 120. Similarly, the TDOA of the signal 112 from the emitter 110 through the first satellite $s_1$ to the ground station 120 and the signal 112 from the emitter 110 through a third satellite $s_3$ to the ground station 120 is also measured, which is denoted as $d_{31}$. Note that the signals 114 to obtain $d_{21}$ and $d_{31}$ are not acquired at the same time so that the positions of the satellites corresponding to $d_{21}$ and $d_{31}$ are not the same.

As also described above, because the satellites $s_1$, $s_2$, and $s_3$ have non-zero velocities with respect to the earth, the received signals 114 at the ground station 120 relayed through the satellites $s_1$, $s_2$, and $s_3$ will be subject to Doppler frequency shift. This causes a frequency difference of arrival (FDOA) of the signals 112 relayed through satellite pair $s_1$ and $s_2$, denoted as $f_{21}$, and an FDOA of the signals 112 relayed through satellite pair $s_1$ and $s_3$, denoted as $f_{31}$. From an FDOA measurement and the locations of the two satellites used in the FDOA measurement, a three-dimensional curved surface can be derived that defines the possible locations of the emitter 110. Again, the ground station 120 does not know precisely the positions and velocities of the satellites. A stationary reference emitter, whose position is known exactly, is used to reduce the effect of the position and velocity errors of the satellites in the estimation of the emitter location.

Within this framework, the TDOA and FDOA measurements can be related to the location of the unknown emitter. The position of the unknown emitter to be found is denoted as $u=[x,y,z]^T$. The true satellite positions and satellite velocities when the signals were acquired are denoted as $s_i^o=[x_i^o,y_i^o,z_i^o]^T$ and $\dot{s}_i^o=[\dot{x}_i^o,\dot{y}_i^o,\dot{z}_i^o]^T$ respectively, where i=1, 2, 3 represents the satellite number. $s_i^o$ and $\dot{s}_i^o$ are not known to the ground station, and only inaccurate satellite positions $s_i = s_i^o +$ $\Delta s_i=[x_i, y_i, z_i]^T$ and velocities $\dot{s}_i = \dot{s}_i^o + \Delta\dot{s}_i=[\dot{x}_i,\dot{y}_i,\dot{z}_i]^T$ are available, where $\Delta s_i$ and $\Delta\dot{s}_i$ represent the errors in satellite positions and velocities. They are modeled as independent identical distributions (IID) with covariance matrices of $\Delta s_i$ equal to $\sigma_s^2 I$ and $\Delta\dot{s}_i$ equal to $\sigma_{\dot{s}}^2 I$, where I is a 3 by 3 identity matrix. The position of the ground station is denoted as $g=[x_g, y_g, z_g]^T$. The Euclidean distance between the two vectors p and q shall be represented by $r_{p,q}=|p-q|$, and $\rho_{p,q}$ shall represent the unit vector given by $$\rho_{p,q} = \frac{(p-q)}{|p-q|}.$$

Figure 2:
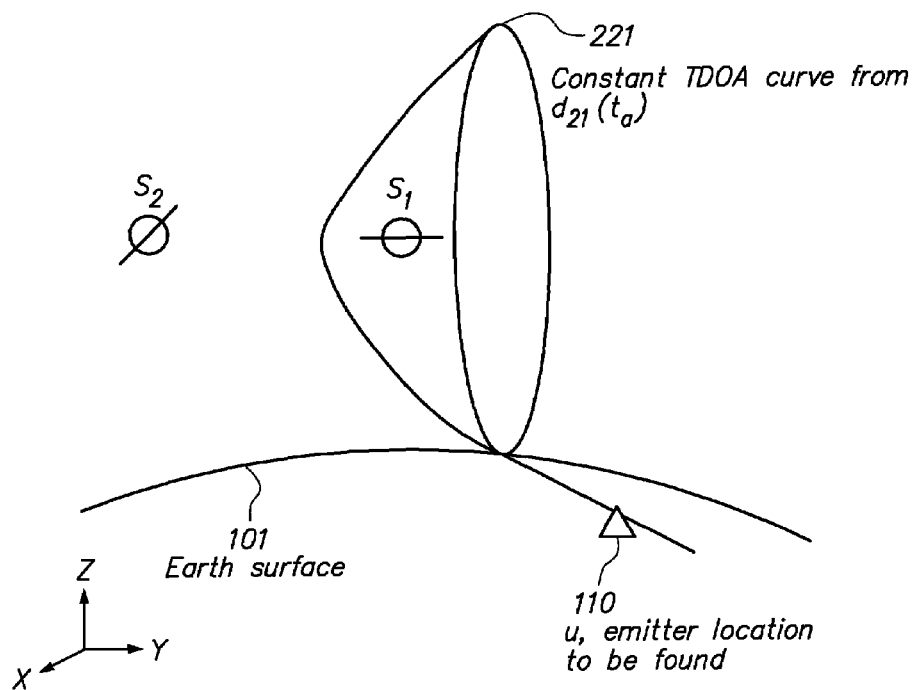
FIG. 2 illustrates an example of the shape of a TDOA curve derived from the time-difference of arrival between the signal from the emitter through the primary satellite $s_1$ to the ground station and the signal from the emitter through another satellite $s_2$ to the ground station, in accordance with one embodiment.

In one embodiment, the two TDOAs are related to the unknown emitter 110 position u as $$d_{21}(t_a) = \frac{1}{p}\left( \begin{array}{c} r_{u,s_2^o(t_a)} - r_{u,s_1^o(t_a)} + \\ r_{g,s_2^o(t_a)} - r_{g,s_1^o(t_a)} \end{array} \right) + b_{d,21}(t_a) + \varepsilon_{d,21} \quad (1)$$

$$d_{31}(t_b) = \frac{1}{p}\left( \begin{array}{c} r_{u,s_3^o(t_a)} - r_{u,s_1^o(t_b)} + \\ r_{g,s_3^o(t_b)} - r_{g,s_1^o(t_b)} \end{array} \right) + b_{d,31}(t_b) + \varepsilon_{d,31} \quad (2)$$

where $d_{21}(t_a)$ is the TDOA between the emitted signal relayed through the adjacent satellite $s_2$ and through the primary satellite $s_1$ at time $t_a$, and $d_{31}(t_b)$ is the TDOA between the emitted signal relayed by the adjacent satellite $s_3$ and by the primary satellite $s_1$ at time $t_b$. $t_a$ and $t_b$ are the time instances when the signals to generate the two TDOAs were collected, and in one embodiment $t_a$ is not equal to $t_b$. More specifically, in one embodiment, the time $t_a$ denotes the mid-point of the time-window during which the emitter signal relayed through satellite $s_1$ and satellite $s_2$ are measured, and time $t_b$ denotes the mid-point of the time-window during which the emitter signal relayed through satellite $s_1$ and satellite $s_3$ are measured. p is the signal propagation speed, $s_2^o(t_a)$ is the true position of the second satellite at time $t_a$, $b_{d,21}(t_a)$ and $b_{d,31}(t_b)$ denote the timing offset from the transponders in the satellites and other fixed bias errors, and $\varepsilon_{d,21}$ and $\varepsilon_{d,31}$ are the random measurement noise. $\varepsilon_{d,21}$ and $\varepsilon_{d,31}$ can have different powers, and they are denoted by $\sigma_{d,21}^2$ and $\sigma_{d,31}^2$. Equation (1) defines a hyperbolic surface on which the emitter 110 is located. The left side of Equation (1) (i.e., $d_{21}(t_a)$) is determined from the measurement, and the right side indicates how $d_{21}(t_a)$ is related to the unknown position u of the emitter 110. Similarly, equation (2) defines another hyperbolic surface on which the emitter 110 is located, based on another TDOA measurement $d_{31}(t_b)$. FIG. 2 illustrates an example of the shape of a TDOA curve 221 derived from $d_{21}(t_a)$, in accordance with one embodiment.

The FDOAs are related to the unknown emitter 110 position u by $$f_{21}(t_c) = -\frac{f_o}{p}\left( \begin{array}{c} \rho_{u,s_2^o(t_c)}^T \dot{s}_2^o(t_c) - \\ \rho_{u,s_1^o(t_c)}^T \dot{s}_1^o(t_c) \end{array} \right) - \\ \frac{1}{p}\left( \begin{array}{c} f_{s_2}\rho_{g,s_2^o(t_c)}^T \dot{s}_2^o(t_c) - \\ f_{s_1}\rho_{g,s_1^o(t_c)}^T \dot{s}_1^o(t_c) \end{array} \right) + b_{f,21}(t_c) + \varepsilon_{f,21} \quad (3)$$

-continued $$f_{31}(t_d) = -\frac{f_o}{p}\left(\frac{\rho_{u,s_3^o(t_d)}{}^T\dot{s}_3^o(t_d) -}{\rho_{u,s_1^o(t_d)}{}^T\dot{s}_1^o(t_d)}\right) - \qquad (4)$$

$$\frac{1}{p}\left(\frac{f_{s_3}\rho_{g,s_3^o(t_d)}{}^T\dot{s}_3^o(t_d) -}{f_{s_1}\rho_{g,s_1^o(t_d)}{}^T\dot{s}_1^o(t_d)}\right) + b_{f,31}(t_d) + \varepsilon_{f,31}$$

where $f_{21}(t_c)$ is the FDOA between the emitted signal relayed by the adjacent satellite $s_2$ and by the primary satellite $s_1$ at time $t_c$, and $f_{31}(t_d)$ is the FDOA between the emitted signal 112 relayed by the adjacent satellite $s_3$ and by the primary satellite $s_1$ at time $t_d$. $t_c$ and $t_d$ are the time instances when the signals to obtain the two FDOAs are collected, and in one embodiment $t_c$ is not equal to $t_d$. More specifically, in one embodiment, the time $t_c$ denotes the mid-point of the time-window during which the emitter signal relayed through satellite $s_1$ and satellite $s_2$ are measured, and time $t_d$ denotes the mid-point of the time-window during which the emitter signal relayed through satellite $s_1$ and satellite $s_3$ are measured. $f_o$ is the uplink center frequency of the signal 114 received at the satellites, $f_{s_i}$ is the downlink center frequency from satellite $s_i$ to the ground station, i=1, 2, 3, p is the signal propagation speed, $b_{f,21}(t_c)$ and $b_{f,31}(t_d)$ account for the local oscillator (LO) offsets from the transponders in the satellites and other fixed bias errors, and $\varepsilon_{f,21}$ and $\varepsilon_{f,31}$ are the random measurement noise. $\varepsilon_{f,21}$ and $\varepsilon_{f,31}$ can have different powers, and they are denoted by $\sigma_{f,21}^2$ and $\sigma_{f,31}^2$. Equations (3) and (4) define another two surfaces from the FDOA measurements on which the emitter 110 is located.

FIG. 1 also shows a reference emitter 130. Let $c=[x_c,y_c,z_c]^T$ be the location of the reference emitter 130 which will be used for calibration to reduce the effect of satellite position and velocity errors. When the TDOAs and FDOAs are obtained from the unknown emitter 110, a measurement is also made of the TDOAs and FDOAs from the calibration reference emitter 130 at the same instances so that $^c d_{21}(t_a)$, $^c d_{31}(t_b)$, $^c f_{21}(t_c)$ and $^c f_{31}(t_d)$ are also available. These expressions have the same forms as $d_{21}(t_a)$, $d_{31}(t_b)$, $f_{21}(t_c)$ and $f_{31}(t_d)$ given in equations (1)-(4), except that u is replaced by c and the random noises $\varepsilon_{d,21}$, $\varepsilon_{d,31}$, $\varepsilon_{f,21}$ and $\varepsilon_{f,31}$ are different. The calibration factors are then formed from $^c d_{21}(t_a)$, $^c d_{31}(t_b)$, $^c f_{21}(t_c)$ and $^c f_{31}(t_d)$ as $$C_{d,21}(t_a) = {}^c d_{21}(t_a) - \frac{1}{p}(r_{c,s_2(t_a)} - r_{c,s_1(t_a)}) \qquad (5)$$

$$C_{d,31}(t_b) = {}^c d_{31}(t_b) - \frac{1}{p}(r_{c,s_3(t_b)} - r_{c,s_1(t_b)}) \qquad (6)$$

$$C_{f,21}(t_c) = {}^c f_{21}(t_c) - \left(-\frac{{}^c f_o}{p}(\rho_{c,s_2(t_c)}{}^T\dot{s}_2(t_c) - \rho_{c,s_1(t_c)}{}^T\dot{s}_1(t_c))\right) \qquad (7)$$

$$C_{f,31}(t_d) = {}^c f_{31}(t_d) - \left(-\frac{{}^c f_o}{p}(\rho_{c,s_3(t_d)}{}^T\dot{s}_3(t_d) - \rho_{c,s_1(t_d)}{}^T\dot{s}_1(t_d))\right) \qquad (8)$$

where $^c f_o$ is the uplink center frequency from the calibration reference emitter 130.

The calibration factors are subtracted from the respective TDOAs and FDOAs of the unknown emitter 110 to minimize the effect of satellite position and velocity errors. The equations that are used to determine the unknown emitter position are $$\tilde{d}_{21}(t_a) = d_{21}(t_a) - C_{d,21}(t_a) \qquad (9)$$
$$= \frac{1}{p}(r_{u,s_2(t_a)} - r_{u,s_1(t_a)})$$

$$\tilde{d}_{31}(t_b) = d_{31}(t_b) - C_{d,31}(t_b) \qquad (10)$$
$$= \frac{1}{p}(r_{u,s_3(t_b)} - r_{u,s_1(t_b)})$$

$$\tilde{f}_{21}(t_c) = f_{21}(t_c) - C_{f,21}(t_c) \qquad (11)$$
$$= -\frac{f_o}{p}(\rho_{u,s_2(t_c)}{}^T\dot{s}_2(t_c) - \rho_{u,s_1(t_c)}{}^T\dot{s}_1(t_c))$$

$$\tilde{f}_{31}(t_d) = f_{31}(t_d) - C_{f,31}(t_d) \qquad (12)$$
$$= -\frac{f_o}{p}(\rho_{u,s_3(t_d)}{}^T\dot{s}_3(t_d) - \rho_{u,s_1(t_d)}{}^T\dot{s}_1(t_d))$$

where the first lines in the above four equations are known quantities from measurements, and the second lines relate the known quantities to the unknown u to be found. Equations (9)-(12) represent equations (1)-(4) where the calibration factors obtained from equations (5)-(8) have been applied to reduce the effect of the errors in satellite positions and velocities. In real world applications, there will be some error, instrument noise, or other source of noise in TDOA and FDOA measurements. Thus, it is unlikely that solving equations (9)-(12) for the emitter position would yield a single position. In one embodiment of the present invention, the location estimates from each measurement are combined to create a more accurate location estimate for the unknown emitter 110.

Figure 3A:
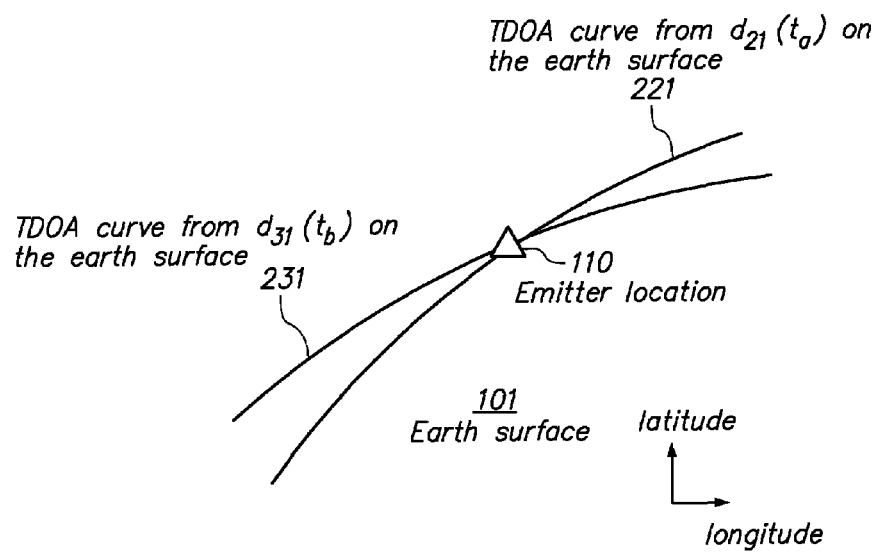
FIG. 3A illustrates an intersection of two TDOA curves on the earth's surface, in accordance with one embodiment.
Figure 3B:
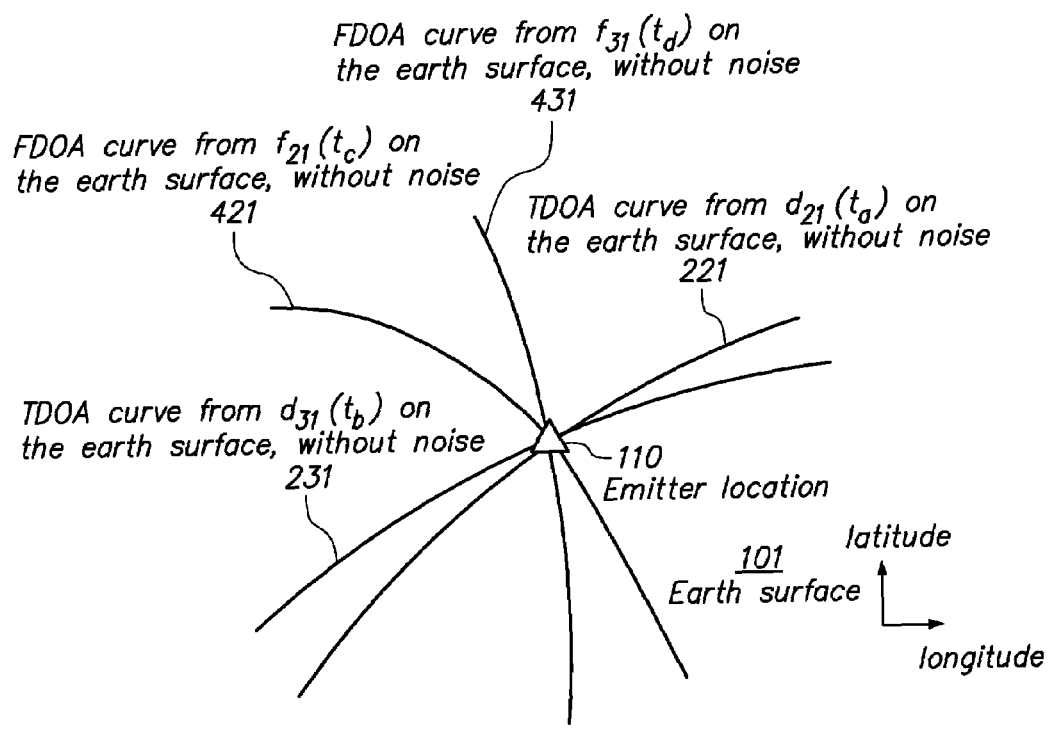
FIG. 3B illustrates an example intersection of two TDOA curves and two FDOA curves, where each of the curves is without noise, in accordance with one embodiment.

As discussed above, each of the equations (5)-(8) defines a surface on which the unknown emitter 110 is located according to the respective measurement. The intersection of the curves on the earth's surface is the estimate of the location of the unknown emitter 110. FIG. 3A illustrates an example of an intersection of two TDOA curves 221, 231 on the earth's surface, in accordance with one embodiment. FIG. 3B illustrates an example intersection of two TDOA curves 221, 231 and two FDOA curves 421, 431, where each of the curves is without noise or other error, in accordance with one embodiment. As shown in FIG. 3B, if the TDOA and FDOA measurements were without noise or other error, the corresponding curves 221, 231, 421, 431 would all intersect at one location that is the true location of the emitter 110.

Figure 3C:
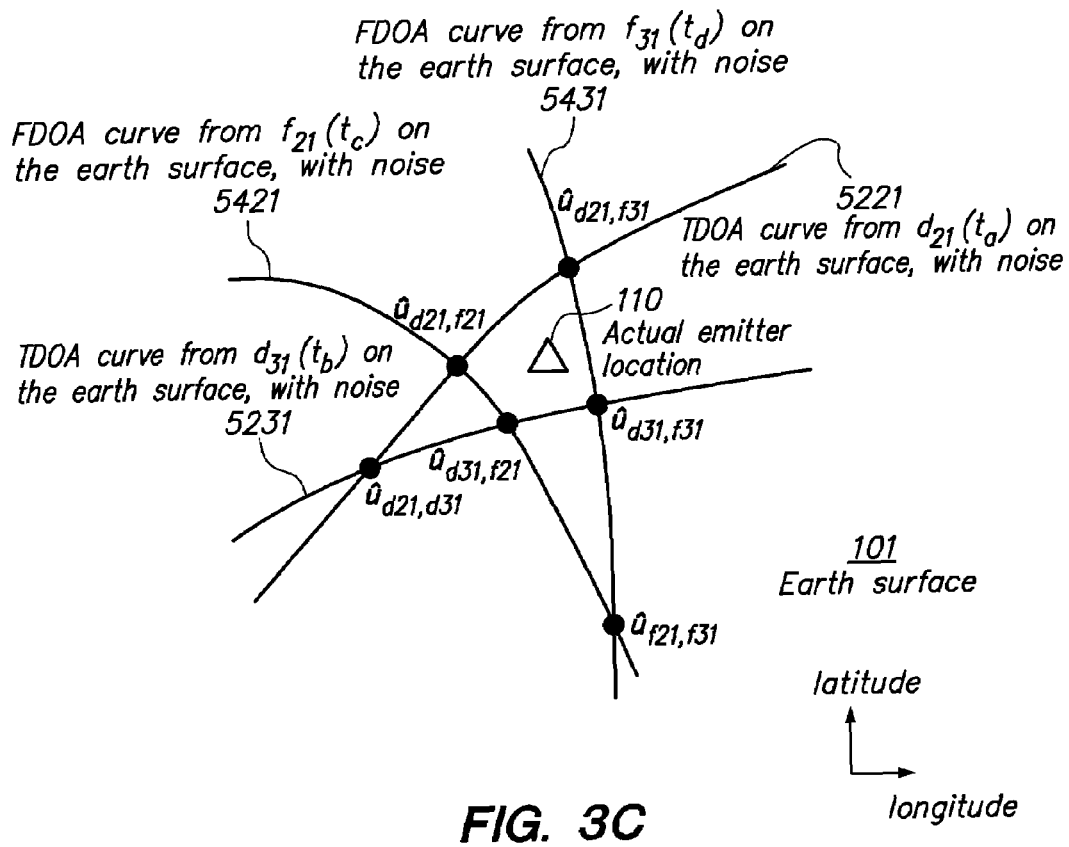
FIG. 3C illustrates an example that compares the actual emitter location to the points of intersection of two TDOA curves and two FDOA curves, wherein each curve includes noise, in accordance with one embodiment.

In real world applications, there will be some error, instrument noise, or other source of noise in TDOA and FDOA measurements. Thus, it is unlikely that the curves corresponding to the TDOA and FDOA measurements will intersect at one point on the earth's surface. FIG. 3C illustrates an example of the location to the points of intersection of two TDOA curves 5221, 5231 and two FDOA curves 5421, 5431, wherein each curve 5221, 5231, 5421, 5431, includes noise, in accordance with one embodiment. Thus, the intersection points of the curves are estimates of the emitter's 110 true location. There are six solutions based on all combinations of two of the four TDOA and FDOA measurements. The possible solutions are denoted as:

$\hat{u}_{d_{21},d_{31}}$: solution obtained from $d_{21}$ and $d_{31}$, using equations (9) and (10)

$\hat{u}_{d_{21},f_{21}}$: solution obtained from $d_{21}$ and $f_{21}$, using equations (9) and (11)

$\hat{u}_{d_{21},f_{31}}$: solution obtained from $d_{21}$ and $f_{31}$, using equations (9) and (12)

$\hat{u}_{d_{31},f_{21}}$: solution obtained from $d_{31}$ and $f_{21}$, using equations (10) and (11)

$\hat{u}_{d_{31},f_{31}}$: solution obtained from $d_{31}$ and $f_{31}$, using equations (10) and (12)

$\hat{u}_{f_{21},f_{31}}$: solution obtained from $f_{21}$ and $f_{31}$, using equations (11) and (12).

The solutions fall into three categories: TDOA-TDOA, TDOA-FDOA, and FDOA-FDOA. Various methods used to solve each category of solution are described in U.S. patent application Ser. No. 11/735,146, titled "Determining A Geolocation Solution Of An Emitter On Earth Using Satellite Signals", which has been incorporated by reference in its entirety. These solutions can be used as initial estimates of the true location of the emitter 110 as will be described below.

Figure 4:
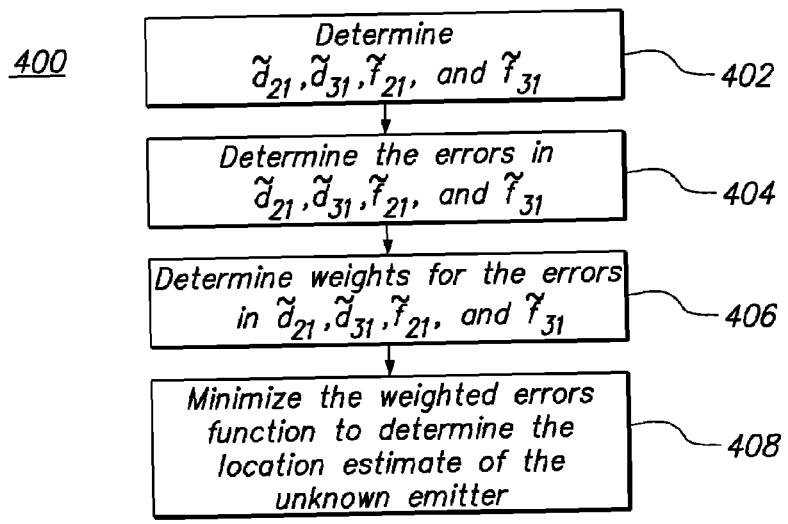
FIG. 4 is a flow chart of a method of estimating the location of an unknown emitter, in accordance with one embodiment.

FIG. 4 is a flow chart of a method 400 of estimating the location of an unknown emitter, in accordance with one embodiment. In step 402, each of the four calibrated TDOA and FDOA measurements are determined. In one embodiment, equations (9)-(12) are used to determine the calibrated TDOA and FDOA measurements.

In step 404, the errors in the four calibrated TDOA and FDOA measurements are determined. Errors from the measurement equations (9)-(12) are determined according to the following equations:

$$e_{d_{21}} = p\tilde{d}_{21}(t_a) - (r_{u,s_2(t_a)} - r_{u,s_1(t_a)}) \tag{13}$$

$$e_{d_{31}} = p\tilde{d}_{31}(t_b) - (r_{u,s_3(t_b)} - r_{u,s_1(t_b)}) \tag{14}$$

$$e_{f_{21}} = \frac{p}{f_o}\tilde{f}_{21}(t_c) - (\rho_{u,s_2(t_c)}{}^T\dot{s}_2(t_c) - \rho_{u,s_1(t_c)}{}^T\dot{s}_1(t_c)) \tag{15}$$

$$e_{f_{31}} = \frac{p}{f_o}\tilde{f}_{31}(t_d) - (\rho_{u,s_3(t_d)}{}^T\dot{s}_3(t_d) - \rho_{u,s_1(t_d)}{}^T\dot{s}_1(t_d)) \tag{16}$$

Equations (13)-(16) are, respectively, the equation errors for the TDOA measurement $d_{21}(t_a)$, the TDOA measurement $d_{31}(t_b)$, the FDOA measurement $f_{21}(t_c)$, and the FDOA measurement $f_{31}(t_d)$, each after differential calibration. While we can select any two equations among (13)-(16) and set their errors on the left side to zero to obtain the emitter location on earth, the solution is not accurate because the equation errors in the two selected equations are in fact not zero due to various sources of noise during measurement. We also have the difficulty in deciding which two equations to select out of four. The motivation in formulating the errors is not to assume them to be zero, but rather by obtaining an emitter location estimate so that the weighted sum of the squares of the errors of (13)-(16) is minimized.

Referring back to FIG. 4, in step 406, the weights for the errors in the four calibrated TDOA and FDOA measurements are determined. In one embodiment, the weights are determined according to the following equations:

$$v_{d_{21}} = 2p^2\sigma_{d,21}^2 + \left(\left|\frac{\partial r_{u,s_2(t_a)}}{\partial s_2(t_a)} - \frac{\partial r_{c,s_2(t_a)}}{\partial s_2(t_a)}\right|^2 \sigma_{s_2}^2 + \left|\frac{\partial r_{u,s_1(t_a)}}{\partial s_1(t_a)} - \frac{\partial r_{c,s_1(t_a)}}{\partial s_1(t_a)}\right|^2 \sigma_{s_1}^2\right) \tag{17}$$

$$v_{d_{31}} = 2p^2\sigma_{d,31}^2 + \left(\left|\frac{\partial r_{u,s_3(t_b)}}{\partial s_3(t_b)} - \frac{\partial r_{c,s_3(t_b)}}{\partial s_3(t_b)}\right|^2 \sigma_{s_3}^2 + \left|\frac{\partial r_{u,s_1(t_b)}}{\partial s_1(t_b)} - \frac{\partial r_{c,s_1(t_b)}}{\partial s_1(t_b)}\right|^2 \sigma_{s_1}^2\right) \tag{18}$$

$$v_{f_{21}} = 2\frac{p^2}{f_o^2}\sigma_{f,21}^2 + \left(\left|\rho_{u,s_2(t_c)} - \frac{cf_o}{f_o}\rho_{c,s_2(t_c)}\right|^2 \sigma_{s_2}^2 + \left|\rho_{u,s_1(t_c)} - \frac{cf_o}{f_o}\rho_{c,s_1(t_c)}\right|^2 \sigma_{s_1}^2\right) + \left(\left|\frac{\partial \rho_{u,s_2(t_c)}{}^T\dot{s}_2(t_c)}{\partial s_2(t_c)} - \frac{cf_o}{f_o}\frac{\partial \rho_{c,s_2(t_c)}{}^T\dot{s}_2(t_c)}{\partial s_2(t_c)}\right|^2 \sigma_{s_2}^2 + \left|\frac{\partial \rho_{u,s_1(t_c)}{}^T\dot{s}_1(t_c)}{\partial s_1(t_c)} - \frac{cf_o}{f_o}\frac{\partial \rho_{c,s_1(t_c)}{}^T\dot{s}_1(t_c)}{\partial s_1(t_c)}\right|^2 \sigma_{s_1}^2\right) \tag{19}$$

$$v_{f_{31}} = 2\frac{p^2}{f_o^2}\sigma_{f,31}^2 + \left(\left|\rho_{u,s_3(t_d)} - \frac{cf_o}{f_o}\rho_{c,s_3(t_d)}\right|^2 \sigma_{s_3}^2 + \left|\rho_{u,s_1(t_d)} - \frac{cf_o}{f_o}\rho_{c,s_1(t_d)}\right|^2 \sigma_{s_1}^2\right) + \left(\left|\frac{\partial \rho_{u,s_3(t_d)}{}^T\dot{s}_3(t_d)}{\partial s_3(t_d)} - \frac{cf_o}{f_o}\frac{\partial \rho_{c,s_3(t_d)}{}^T\dot{s}_3(t_d)}{\partial s_3(t_d)}\right|^2 \sigma_{s_3}^2 + \left|\frac{\partial \rho_{u,s_1(t_d)}{}^T\dot{s}_1(t_d)}{\partial s_1(t_d)} - \frac{cf_o}{f_o}\frac{\partial \rho_{c,s_1(t_d)}{}^T\dot{s}_1(t_d)}{\partial s_1(t_d)}\right|^2 \sigma_{s_1}^2\right) \tag{20}$$

where $\sigma_{s_i}^2$ is the position error power and $\sigma_{\dot{s}_i}^2$ is the velocity error power of $s_i$, i=1, 2, 3, and $\sigma_{d,21}^2$ is the measurement noise power of the $d_{21}$ measurement, $\sigma_{d,31}^2$ is the measurement noise power of the $d_{31}$ measurement, $\sigma_{f,21}^2$ is the measurement noise power of the $f_{21}$ measurement, and $\sigma_{f,31}^2$ is the measurement noise power of the $f_{31}$ measurement. Equations (17)-(20), respectively, are the inverse of the weight for the equation error of $d_{21}(t_a)$, $d_{31}(t_b)$, $f_{21}(t_c)$, and $f_{31}(t_d)$, each after differential calibration. Note that the weights are dependent on the true emitter 110 position u that is not known. In one embodiment, u is replaced in the above four equations (17)-(20) by a preliminary estimate of u as $\hat{u}_{d_i,f_{j1}}$, for any i=2 or 3, and j=2 or 3. In some embodiments, any one of the TDOA-FDOA solutions is typically more accurate than a TDOA-TDOA or FDOA-FDOA solution, but an estimate of the true emitter 110 position from a TDOA-TDOA or FDOA-FDOA solution can also be used in equations (17)-(20). Note that if the FDOA measurement is very inaccurate compared to TDOA, the TDOA-TDOA solution is a better choice for the preliminary estimate to find the values according to (17)-(20).

Several factors were considered in deriving the weight equations (17)-(20). For example, the weights are derived based on the geolocation geometry, the amount of TDOA and FDOA measurement noise, the amount of error in satellite positions and velocities, the positions and velocities of the satellites, and the position of the reference emitter 130. All of these can be factored into the weights assigned to each of the errors in the four TDOA and FDOA measurements. For instance, if the satellite position and velocity errors are small and the localization geometry is such that the second components on the right of (17)-(20) are relatively small compared to the first terms, the inverse of the weight values will be dominated by the errors in the measurements. If the TDOA measurements are more accurate than the FDOA measurements such that $\sigma_d^2 < \sigma_f^2/f_o^2$, then according to (17)-(20) the weights for the TDOA equation errors $e_{d_{21}}^2$ and $e_{d_{31}}^2$ will be larger than that for the FDOA errors, $e_{f_{21}}^2$ and $e_{f_{31}}^2$. The rationale is because TDOA measurements are generally more reliable than the FDOAs. These weights are applied to each of the errors in the TDOA and FDOA measurements to form a weighted error function $\xi(u)$ of the form:

$$\xi(u) = \frac{1}{v_{d_{21}}} e_{d_{21}}^2 + \frac{1}{v_{d_{31}}} e_{d_{31}}^2 + \frac{1}{v_{f_{21}}} e_{f_{21}}^2 + \frac{1}{v_{d_{31}}} e_{d_{31}}^2 \quad (21)$$

where the error function is shown explicitly to be dependent on the emitter location u.

In step 408, the weighted errors function is minimized to determine the location estimate of the unknown emitter 110. In other words, the value of u that minimizes the error function is determined to be the location of the emitter 110. In one embodiment, a Taylor-series technique is used to linearize the errors in the four TDOA and FDOA measurements, i.e., equations (13)-(16). Then, weighted linear least-squares minimization is applied to obtain the emitter location estimate that minimizes the weighted error function $\xi(u)$ in (21). The determined location represents an estimate informed by all of the TDOA and FDOA measurements from the combinations of the three satellites, $s_1$, $s_2$, and $s_3$. Thus, in one embodiment, a more accurate emitter position estimate is obtained directly from the four TDOA and FDOA measurements than would be achieved by considering a smaller subset of measurements.

In an alternate embodiment, it is not necessary to use a TDOA-FDOA, TDOA-TDOA, or FDOA-FDOA solution in step 406 to determine the weights for the errors in the four TDOA and FDOA measurements. In one embodiment, the inverse of the weight values $v_{d_{21}}$, $v_{d_{31}}$, $v_{f_{21}}$, and $v_{f_{31}}$ are set to unity and equation (21) is solved to obtain an initial emitter location. This initial emitter location is then used to obtain the weights using equations (17)-(20). Then, a more accurate emitter location can be estimated by minimizing the weighted errors function (21). This process can be iterated until the emitter 110 location estimate does not change. A better initial estimate of the emitter 110 location will usually reduce the number of iterations needed to reach a final estimate. A better initial estimate may also give a more accurate location estimate for the emitter 110 in some cases.

The above description is included to illustrate the operation of the embodiments and is not meant to limit the scope of the invention. From the above discussion, many variations will be apparent to one skilled in the relevant art that would yet be encompassed by the spirit and scope of the invention. Those of skill in the art will also appreciate that the invention may be practiced in other embodiments. First, the particular naming of the components, capitalization of terms, the attributes, or structural aspect is not mandatory or significant, and the mechanisms that implement the invention or its features may have different names, formats, or protocols. Further, the system may be implemented via a combination of hardware and software or entirely in hardware elements. Also, the particular division of functionality between the various system components described herein is merely exemplary, and not mandatory; functions performed by a single system component may instead be performed by multiple components, and functions performed by multiple components may instead performed by a single component.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the methods described in the specification may be implemented by a single processor or be implemented in architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of determining a geolocation of an emitter from two time-difference of arrival measurements and two frequency-difference of arrival measurements, each from a different time, the method comprising:

determining a first time-difference of arrival between a first signal from the emitter relayed by a first satellite and the first signal relayed by a second satellite, wherein the first signal is received at a first time;

determining a second time-difference of arrival between a second signal from an emitter relayed by the first satellite and the second signal relayed by a third satellite, wherein the second signal is received at a second time, the second time being different from the first time;

determining a first frequency-difference of arrival between a third signal relayed by the first satellite and the third signal relayed by the second satellite, wherein the third signal is received at a third time, the third time being different from the first time and the second time;

determining a second frequency-difference of arrival between a fourth signal relayed by the first satellite and the fourth signal relayed by the third satellite, wherein the fourth signal is received at a fourth time, the fourth time being different from the first time, the second time, and the third time;

determining a first error in the first time-difference of arrival;

determining a second error in the second time-difference of arrival;

determining a third error in the first frequency-difference of arrival;

determining a fourth error in the second frequency-difference of arrival;

determining a first weight for the first error;

determining a second weight for the second error;

determining a third weight for the third error;

determining a fourth weight for the fourth error; and minimizing a weighted errors function based on a combination of the first weight applied to a square of the first error, the second weight applied to a square of the second error, the third weight applied to a square of the third error, and the fourth weight applied to a square of the fourth error to determine the geolocation of the emitter.

2. The method of claim 1, wherein minimizing a weighted errors function comprises minimizing $$\frac{1}{v_{d_{21}}}e_{d_{21}}^2 + \frac{1}{v_{d_{31}}}e_{d_{31}}^2 + \frac{1}{v_{f_{21}}}e_{f_{21}}^2 + \frac{1}{v_{d_{31}}}e_{d_{31}}^2,$$

wherein $v_{d_{21}}$ is an inverse of the first weight, $v_{d_{31}}$ is an inverse of the second weight, $v_{f_{21}}$ is an inverse of the third weight, $v_{f_{31}}$ is an inverse of the fourth weight, $e_{d_{21}}$ is the first error, $e_{d_{31}}$ is the second error, $e_{f_{21}}$ is the third error, and $e_{d_{31}}$ is the fourth error.

3. The method of claim 1, wherein $v_{d_{21}}$ is an inverse of the first weight and is determined according to $$v_{d_{21}} = 2p^2\sigma_{d,21}^2 + \left(\begin{array}{l}\left|\frac{\partial r_{u,s_2(t_a)}}{\partial s_2(t_a)} - \frac{\partial r_{c,s_2(t_a)}}{\partial s_2(t_a)}\right|^2\sigma_{s_2}^2 + \\ \left|\frac{\partial r_{u,s_1(t_a)}}{\partial s_1(t_a)} - \frac{\partial r_{c,s_1(t_a)}}{\partial s_1(t_a)}\right|^2\sigma_{s_1}^2\end{array}\right)$$

wherein p is the signal propagation speed, $\sigma_{d,21}^2$ is a first measurement noise power of the first time-difference of arrival, $r_{u,s_2(t_a)}$ is a distance between an estimate of a geolocation of the emitter and the second satellite at the first time, $s_2(t_a)$ is a position of the second satellite at the first time, $r_{c,s_2(t_a)}$ is a distance between a location of a reference emitter and the second satellite at the first time, $\sigma_{s_2}^2$ is a position error power of the second satellite, $r_{u,s_1(t_a)}$ is a distance between the estimate of the geolocation of the emitter and the first satellite at the first time, $s_1(t_a)$ is a position of the first satellite at the first time, $r_{c,s_1(t_a)}$ is a distance between the location of a reference emitter and the first satellite at the first time, and $\sigma_{s_1}^2$ is a position error power of the first satellite.

4. The method of claim 1, wherein an increase in a first measurement noise power in the first time-difference of arrival determination results in a decrease in the first weight.

5. The method of claim 1, wherein an increase in a first position error power of the first satellite or an increase in a second position error power of the second satellite results in a decrease in the first weight.

6. The method of claim 1, wherein at least one of the first, second, third, and fourth weights depend on at least one of an amount of measurement noise, a position or velocity of a satellite, and an error in position or velocity of a satellite.

7. The method of claim 1, wherein the first, second, third, and fourth weights depend on an estimate of the geolocation of the emitter.

8. The method of claim 7, further comprising determining a preliminary estimate of the emitter location based on at least one selected from the group consisting of the first and second time-difference of arrivals and based on at least one selected from the group consisting of the first and second frequency-difference of arrivals, wherein the preliminary estimate is used as the estimate of the geolocation of the emitter on which the weights are based.

9. A method of determining a geolocation of an emitter from two time-difference of arrival measurements and two frequency-difference of arrival measurements, each from a different time, the method comprising:

determining a first time-difference of arrival between a first signal from the emitter relayed by a first satellite and the first signal relayed by a second satellite, wherein the first signal is received at a first time;

determining a second time-difference of arrival between a second signal from an emitter relayed by the first satellite and the second signal relayed by a third satellite, wherein the second signal is received at a second time, the second time being different from the first time;

determining a first frequency-difference of arrival between a third signal relayed by the first satellite and the third signal relayed by the second satellite, wherein the third signal is received at a third time, the third time being different from the first time and the second time;

determining a second frequency-difference of arrival between a fourth signal relayed by the first satellite and the fourth signal relayed by the third satellite, wherein the fourth signal is received at a fourth time, the fourth time being different from the first time, the second time, and the third time;

determining a first calibration factor from a third time-difference of arrival between a first calibration signal relayed by the first satellite and the first calibration signal relayed by the second satellite, wherein the first calibration signal is received at the first time;

determining a second calibration factor from a fourth time-difference of arrival between a second calibration signal relayed by the first satellite and the second calibration signal relayed by the third satellite, wherein the second calibration signal is received at the second time;

determining a third calibration factor from a third frequency-difference of arrival between a third calibration signal relayed by the first satellite and the third calibration signal relayed by the second satellite, wherein the third calibration signal is received at the third time;

determining a fourth calibration factor from a fourth frequency-difference of arrival between a fourth calibration signal relayed by the first satellite and the fourth calibration signal relayed by the third satellite, wherein the fourth calibration signal is received at the fourth time;

subtracting the first calibration factor from the first time-difference of arrival to generate a calibrated first time-difference of arrival;

subtracting the second calibration factor from the second time-difference of arrival to generate a calibrated second time-difference of arrival;

subtracting the third calibration factor from the first frequency-difference of arrival to generate a calibrated first frequency-difference of arrival;

subtracting the fourth calibration factor from the second frequency-difference of arrival to generate a calibrated second frequency-difference of arrival;

determining a first error in the calibrated first time-difference of arrival;

determining a second error in the calibrated second time-difference of arrival;

determining a third error in the calibrated first frequency-difference of arrival;

determining a fourth error in the calibrated second frequency-difference of arrival;

determining a first weight for the first error;

determining a second weight for the second error;

determining a third weight for the third error;

determining a fourth weight for the fourth error; and minimizing a weighted errors function based on a combination of the first weight applied to a square of the first error, the second weight applied to a square of the second error, the third weight applied to a square of the third error, and the fourth weight applied to a square of the fourth error to determine the geolocation of the emitter.

10. The method of claim 9, wherein the first, second, third, and fourth calibration signals are emitted by a reference emitter having a known location.

11. The method of claim 10, wherein the first, second, third, and fourth weights are based on the known location of the reference emitter.

12. The method of claim 10, wherein the first, second, third, and fourth weights are dependent on a localization geometry between an estimate of a location of the emitter, the known location of the reference emitter, and positions and velocities of the first, second, and third satellites.

13. A computer program product for determining a geolocation of an emitter from two time-difference of arrival measurements and two frequency-difference of arrival measurements, each from a different time, the computer program product stored on a computer readable medium and adapted to perform the operations of:

determining a first time-difference of arrival between a first signal from the emitter relayed by a first satellite and the first signal relayed by a second satellite, wherein the first signal is received at a first time;

determining a second time-difference of arrival between a second signal from an emitter relayed by the first satellite and the second signal relayed by a third satellite, wherein the second signal is received at a second time, the second time being different from the first time;

determining a first frequency-difference of arrival between a third signal relayed by the first satellite and the third signal relayed by the second satellite, wherein the third signal is received at a third time, the third time being different from the first time and the second time;

determining a second frequency-difference of arrival between a fourth signal relayed by the first satellite and the fourth signal relayed by the third satellite, wherein the fourth signal is received at a fourth time, the fourth time being different from the first time, the second time, and the third time;

determining a first error in the first time-difference of arrival;

determining a second error in the second time-difference of arrival;

determining a third error in the first frequency-difference of arrival;

determining a fourth error in the second frequency-difference of arrival;

determining a first weight for the first error;

determining a second weight for the second error;

determining a third weight for the third error;

determining a fourth weight for the fourth error; and minimizing a weighted errors function based on a combination of the first weight applied to a square of the first error, the second weight applied to a square of the second error, the third weight applied to a square of the third error, and the fourth weight applied to a square of the fourth error to determine the geolocation of the emitter.

14. The computer program product of claim 13, wherein minimizing a weighted errors function comprises minimizing $$\frac{1}{v_{d_{21}}}e_{d_{21}}^2 + \frac{1}{v_{d_{31}}}e_{d_{31}}^2 + \frac{1}{v_{f_{21}}}e_{f_{21}}^2 + \frac{1}{v_{d_{31}}}e_{d_{31}}^2,$$

wherein $v_{d_{21}}$ is an inverse of the first weight, $v_{d_{31}}$ is an inverse of the second weight, $v_{f_{21}}$ is an inverse of the third weight, $v_{f_{31}}$ is an inverse of the fourth weight, $e_{d_{21}}$ is the first error, $e_{d_{31}}$ is the second error, $e_{f_{21}}$ is the third error, and $e_{d_{31}}$ is the fourth error.

15. The computer program product of claim 13, wherein $v_{d_{21}}$ is an inverse of the first weight and is determined according to $$v_{d_{21}} = 2p^2 \sigma_{d,21}^2 + \left( \left| \frac{\partial r_{u,s_2(t_a)}}{\partial s_2(t_a)} - \frac{\partial r_{c,s_2(t_a)}}{\partial s_2(t_a)} \right|^2 \sigma_{s_2}^2 + \left| \frac{\partial r_{u,s_1(t_a)}}{\partial s_1(t_a)} - \frac{\partial r_{c,s_1(t_a)}}{\partial s_1(t_a)} \right|^2 \sigma_{s_1}^2 \right)$$

wherein p is the signal propagation speed, $\sigma_{d,21}^2$ is a first measurement noise power of the first time-difference of arrival, $r_{u,s_2(t_a)}$ is a distance between an estimate of a geolocation of the emitter and the second satellite at the first time, $s_2(t_a)$ is a position of the second satellite at the first time, $r_{c,s_2(t_a)}$ is a distance between a location of a reference emitter and the second satellite at the first time, $\sigma_{s_2}^2$ is a position error power of the second satellite, $r_{u,s_1(t_a)}$ is a distance between the estimate of the geolocation of the emitter and the first satellite at the first time, $s_1(t_a)$ is a position of the first satellite at the first time, $r_{c,s_1(t_a)}$ is a distance between the location of a reference emitter and the first satellite at the first time, and $\sigma_{s_1}^2$ is a position error power of the first satellite.

16. The computer program product of claim 13, wherein an increase in a first measurement noise power in the first time-difference of arrival determination results in a decrease in the first weight.

17. The computer program product of claim 13, wherein an increase in a first position error power of the first satellite or an increase in a second position error power of the second satellite results in a decrease in the first weight.

18. The computer program product of claim 13, wherein at least one of the first, second, third, and fourth weights depend on at least one of an amount of measurement noise, a position or velocity of a satellite, and an error in position or velocity of a satellite.

19. The computer program product of claim 13, wherein the first, second, third, and fourth weights depend on an estimate of the geolocation of the emitter.

20. The computer program product of claim 19, further comprising determining a preliminary estimate of the emitter location based on at least one selected from the group consisting of the first and second time-difference of arrivals and based on at least one selected from the group consisting of the first and second frequency-difference of arrivals, wherein the preliminary estimate is used as the estimate of the geolocation of the emitter on which the weights are based.

21. A computer program product for determining a geolocation of an emitter from two time-difference of arrival measurements and two frequency-difference of arrival measurements, each from a different time, the computer program product stored on a computer readable medium and adapted to perform the operations of:
- determining a first time-difference of arrival between a first signal from the emitter relayed by a first satellite and the first signal relayed by a second satellite, wherein the first signal is received at a first time;
- determining a second time-difference of arrival between a second signal from an emitter relayed by the first satellite and the second signal relayed by a third satellite, wherein the second signal is received at a second time, the second time being different from the first time;
- determining a first frequency-difference of arrival between a third signal relayed by the first satellite and the third signal relayed by the second satellite, wherein the third signal is received at a third time, the third time being different from the first time and the second time;
- determining a second frequency-difference of arrival between a fourth signal relayed by the first satellite and the fourth signal relayed by the third satellite, wherein the fourth signal is received at a fourth time, the fourth time being different from the first time, the second time, and the third time;
- determining a first calibration factor from a third time-difference of arrival between a first calibration signal relayed by the first satellite and the first calibration signal relayed by the second satellite, wherein the first calibration signal is received at the first time;
- determining a second calibration factor from a fourth time-difference of arrival between a second calibration signal relayed by the first satellite and the second calibration signal relayed by the third satellite, wherein the second calibration signal is received at the second time;
- determining a third calibration factor from a third frequency-difference of arrival between a third calibration signal relayed by the first satellite and the third calibration signal relayed by the second satellite, wherein the third calibration signal is received at the third time;
- determining a fourth calibration factor from a fourth frequency-difference of arrival between a fourth calibration signal relayed by the first satellite and the fourth calibration signal relayed by the third satellite, wherein the fourth calibration signal is received at the fourth time;
- subtracting the first calibration factor from the first time-difference of arrival to generate a calibrated first time-difference of arrival;
- subtracting the second calibration factor from the second time-difference of arrival to generate a calibrated second time-difference of arrival;
- subtracting the third calibration factor from the first frequency-difference of arrival to generate a calibrated first frequency-difference of arrival;
- subtracting the fourth calibration factor from the second frequency-difference of arrival to generate a calibrated second frequency-difference of arrival;
- determining a first error in the calibrated first time-difference of arrival;
- determining a second error in the calibrated second time-difference of arrival;
- determining a third error in the calibrated first frequency-difference of arrival;
- determining a fourth error in the calibrated second frequency-difference of arrival;
- determining a first weight for the first error;
- determining a second weight for the second error;
- determining a third weight for the third error;
- determining a fourth weight for the fourth error; and
- minimizing a weighted errors function based on a combination of the first weight applied to a square of the first error, the second weight applied to a square of the second error, the third weight applied to a square of the third error, and the fourth weight applied to a square of the fourth error to determine the geolocation of the emitter.

22. The computer program product of claim 21, wherein the first, second, third, and fourth calibration signals are emitted by a reference emitter having a known location.

23. The computer program product of claim 22, wherein the first, second, third, and fourth weights are based on the known location of the reference emitter.

24. The computer program product of claim 22, wherein the first, second, third, and fourth weights are dependent on a localization geometry between an estimate of a location of the emitter, the known location of the reference emitter, and positions and velocities of the first, second, and third satellites.

* * * * *